No. 785,581. PATENTED MAR. 21, 1905.
A. V. SHORTS.
LEVEL.
APPLICATION FILED APR. 6, 1904.

2 SHEETS—SHEET 1.

Witnesses:
H. H. Butler
E. E. Potter

Inventor
A. V. Shorts,
By N. C. Everett Co.
Attorneys

No. 785,581. PATENTED MAR. 21, 1905.
A. V. SHORTS.
LEVEL.
APPLICATION FILED APR. 6, 1904.
2 SHEETS—SHEET 2.
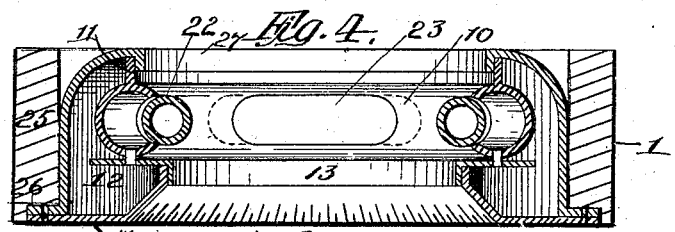
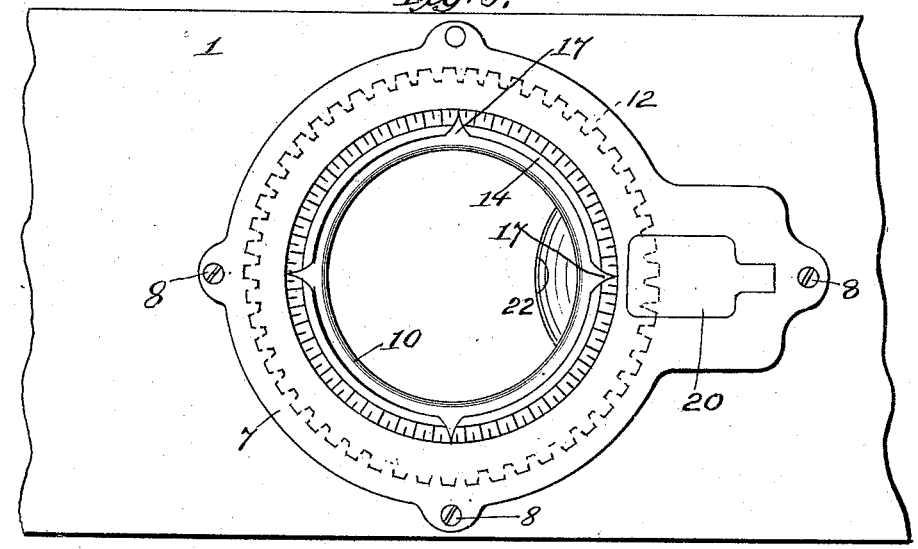
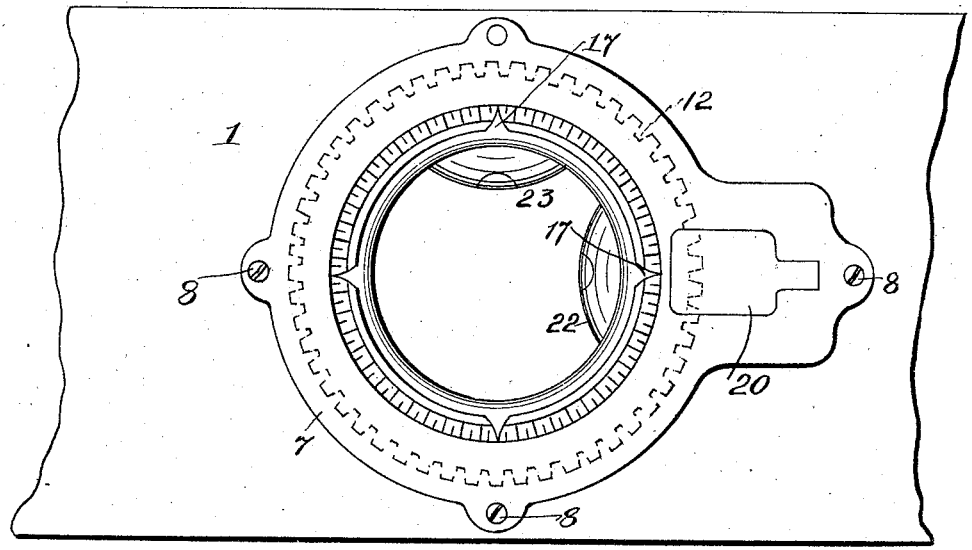
Witnesses: Inventor.
A. V. Shorts,
By
Attorneys.

No. 785,581. Patented March 21, 1905.

UNITED STATES PATENT OFFICE.

ALVERTUS V. SHORTS, OF ALLEGHENY, PENNSYLVANIA.

LEVEL.

SPECIFICATION forming part of Letters Patent No. 785,581, dated March 21, 1905.

Application filed April 6, 1904. Serial No. 201,808.

*To all whom it may concern:*

Be it known that I, ALVERTUS V. SHORTS, a citizen of the United States of America, residing at Allegheny, in the county of Allegheny and State of Pennsylvania, have invented certain new and useful Improvements in Levels, of which the following is a specification, reference being had therein to the accompanying drawings.

This invention has relation to spirit-levels, and has for its object the provision of a level of novel form containing a plurality of level-glasses which may be used to determine the angle of vertical and horizontal surfaces.

In carrying my invention into effect I mount four independent level-glasses in an annular revoluble frame which is arranged in the center of a level and I provide novel means whereby the frame carrying the level-glasses may be revolved so as to bring the glasses to any desired angle to the sides or end of the level, and I provide a scale and pointers by means of which the angle of each one of the glasses may be determined.

My invention consists in the novel construction, combination, and arrangement of parts to be hereinafter more fully described and claimed.

Figure 1:
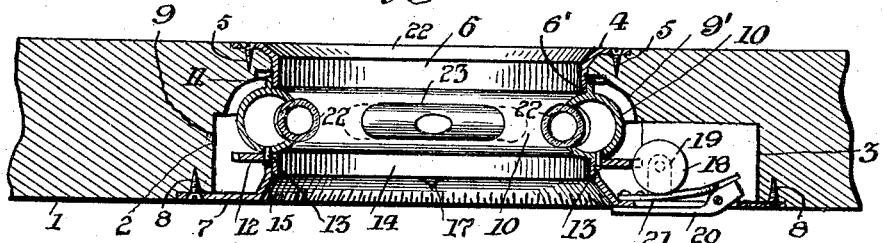
Figure 2:
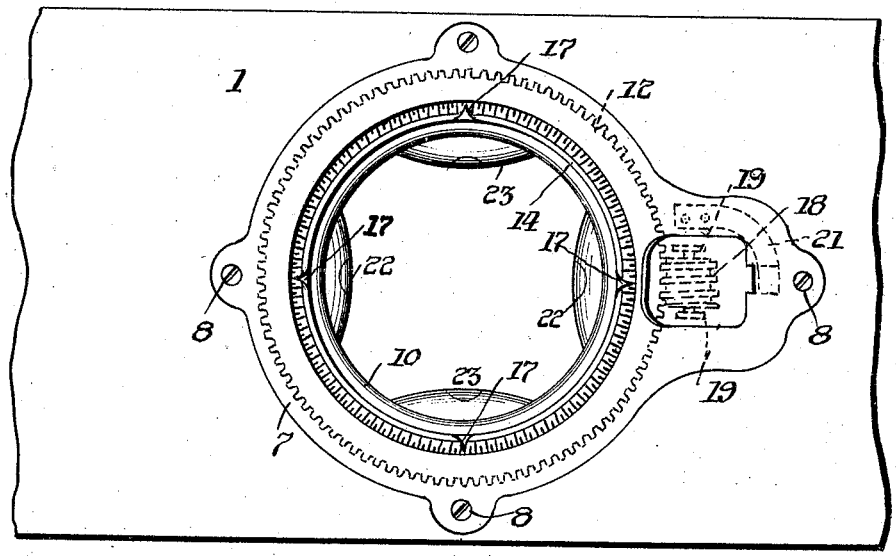
Figure 3:
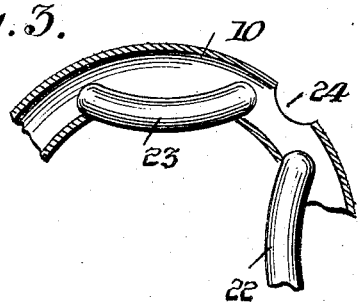

In the accompanying drawings, Figure 1 is a vertical longitudinal sectional view of a spirit-level constructed according to my invention, the view being taken on a line drawn centrally through Fig. 2. Fig. 2 is an elevation looking at the side of the level. Fig. 3 is a detail sectional view of part of the annular ring in which the level-glasses are sustained. Figs. 4, 5, and 6 are plan views of modified forms of the level.

The level 1 is a flat rectangular section of wood or other material and is formed with an annular opening 2 at its center, extending from side to side and communicating with a recess 3 at one side. The opening 2 receives on one side an angular ring 4, which is laid into the side of the level and secured in position by screws 5 and has a depending lip 6. The opening on the opposite side of the level is fitted with a similar ring 7, which is secured in position by screws 8 8. The ring 7 is set into the side of the level so that its outer surface is flush therewith. The body of the level 1 is cut away, as at 9', to accommodate an annular tube 10, which is formed with a flange 11, that fits behind the lip 6, formed on the ring 4, and carries an annular rack 12, secured to the annular tube 10 by pins 13 13. The annular rack 12 is formed with a lateral flange 14, that fits within an annular flange 15, that is formed on the ring 7. The ring 7 inclines inwardly from the face of the level to the flange 15, as shown, and the edge of the inclined portion is graduated, as shown at 16, and pointers 17, carried by the lateral flange 14 of the rack, travel over the graduations 16 when the tube 10 is revolved and serve to indicate the angles of the surfaces to which the level is applied.

A worm 18 is journaled between ears 19 19 in the recess 3, the said worm meshing with the rack 12 and serving as a means whereby the said rack and the annular tube 10 may be moved to any desired extent in a circular path. The recess 3 is closed by a hinged door 20, which is maintained in closed position by a spring 21, the said door being opened when it is desired to turn the worm 18 for the adjustment of the tube 10.

The annular tube 10 is cut away at four points on its inner side, and in the openings so formed are affixed curved spirit or level glasses 22 22 and 23 23, the glasses 22 22 being diametrically opposite one another and the glasses 23 23 being also diametrically opposite one another and the four glasses being disposed an equal distance apart, with their centers in alinement with the pointers 17.

In operation the annular tube 10 rests normally in the position shown in Fig. 2 of the drawings—that is, with the pointers 17 17 in alinement with the longitudinal axis of the level 1. In this position the level can be used in the ordinary manner on vertical or horizontal surfaces, the glasses 23 23 being used in leveling horizontal surfaces and the glasses 22 22 being used in leveling vertical surfaces.

To determine the angle of a surface approximating the horizontal line, the level is laid upon such surface and the door 20 being opened the worm 18 is turned and the annular tube thereby revolved until the bubble in the glass adjacent the surface is at the center of the glass, the pointer 17, adjacent that glass, then indicating the angle of the surface to which the level has been applied. To determine the angle of a surface approximating the vertical line, the same procedure is followed, but the angles are read from the pointer adjacent to one or the other of the glasses 22 22.

While I have found that four spirit-glasses greatly facilitate the use of the level under various conditions, one of the glasses 22 and one of the glasses 23 may, if desired, be dispensed with, as shown in Fig. 5, without departing from the spirit of my invention, and in some cases the instruments can be provided with but a single glass, as shown in Fig. 6; but under the latter construction the adjustment of the tubular ring would of course consume considerably more time than where a plurality of glasses are used.

The tube 10 is formed with an opening 24, and after the glasses 22 23 have been placed in position they are secured in the tube by pouring plaster-of-paris or other suitable material through the hole 24, and thereby filling the tube with such material.

The purpose of providing the four glasses is to allow of the level being used to determine various surfaces without the necessity of turning it over or turning it end for end.

The device as shown in Figs. 1 and 2 of the drawings is adapted and designed to be permanently attached in position in the level-body.

I have invented and have illustrated in Fig. 4 of the drawings a modified form of device which is adapted and designed to be temporarily attached to an ordinary straight-edge. In the modified form it is to be understood that the tube 10, with its glasses 22 22 and 23 23, the rack 12 and its depending flange, the ring 7, the nurled worm 18, the door 20, and the spring 21 are all employed in the same manner as in the device shown in Figs. 1 and 2. In the modified form, however, the ring 4 is dispensed with and a cap 25 is provided, which has a flange 26 on its lower edge, that rests on and is riveted or otherwise secured to the ring 7. This cap turns inwardly at its upper edge and is formed with a depending flange 27, that fits inside of the flange 11 on the tube 10 and that serves to retain the tube in its proper position. This device is shown in Fig. 4, it being understood that the construction of the cap is such that it will cover the worm at the side, and thus form a perfect protective covering for the movable parts of the device and enable it to be safely handled, transported, and applied to and removed from an ordinary straight-edge without difficulty or danger of injury to any part of the device.

Having fully described my invention, what I claim as new, and desire to secure by Letters Patent, is—

1. In a spirit-level, the combination with a level-body, of an annular tube revolubly mounted in the body, spirit-glasses carried by said tube, a rack carried by said tube, and a worm engaging with said rack.

2. In a level, the combination with a level-body having an opening and a recess, of an annular tube mounted in the opening in said body, spirit-glasses carried by said tube, and an annular rack carried by said tube, a worm mounted in the recess adjacent to said rack, and a spring-pressed door covering said recess.

3. In a device of the character described, the combination with the level-body, of a ring secured on one side of the same and having a depending lip, a ring secured on the other side of the level-body and having a vertical flange, a tube having a flange embracing said lip, glasses carried by said tube, a rack carried by said tube, the tube being supported by said rings, and means engaging with the rack for turning the tube.

4. The combination with a level-body having an opening extending from side to side of the body, of glass-supporting means revolubly mounted in said opening, a ring attached to the level-body at each end of said opening, each ring having an inwardly-extending flange engaging the glass-supporting means, a spirit-glass carried in the glass-supporting means and means for revolving the glass-supporting means.

In testimony whereof I affix my signature in the presence of two witnesses.

ALVERTUS V. SHORTS.

Witnesses:
H. C. EVERT,
K. H. BUTLER.